US012554703B2

(12) United States Patent
Liu et al.

(10) Patent No.: US 12,554,703 B2
(45) Date of Patent: Feb. 17, 2026

(54) INCREMENTAL UPDATES OF CONFLATED DATA RECORDS

(71) Applicant: Microsoft Technology Licensing, LLC, Redmond, WA (US)

(72) Inventors: Lengning Liu, Redmond, WA (US); Prabhakar Goyal, Sammamish, WA (US); Varun Darbari, Redmond, WA (US); Meiyalagan Balasubramanian, Redmond, WA (US); Venkatesh Mantha, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 17/244,626

(22) Filed: Apr. 29, 2021

(65) Prior Publication Data

US 2022/0350792 A1    Nov. 3, 2022

(51) Int. Cl.
*G06F 16/23* (2019.01)
*G06F 16/2458* (2019.01)

(52) U.S. Cl.
CPC ...... *G06F 16/2379* (2019.01); *G06F 16/2468* (2019.01)

(58) Field of Classification Search
CPC .................. G06F 16/2379; G06F 16/2468
See application file for complete search history.

(56) References Cited

U.S. PATENT DOCUMENTS

| 6,763,352 B2 | 7/2004 | Cochrane et al. |
| 2010/0106724 A1* | 4/2010 | Anderson ............. G06F 16/285 707/E17.046 |
| 2014/0310232 A1* | 10/2014 | Plattner ............. G06F 16/24539 707/602 |

(Continued)

FOREIGN PATENT DOCUMENTS

WO    2014053613 A2    4/2014

OTHER PUBLICATIONS

"Data Warehouse Infrastructure: Full vs Incremental Loading in ETL", Retrieved From : https://panoply.io/data-warehouse-guide/data-warehouse-etl/, Retrieved Date: Feb. 18, 2021, 2 Pages.

(Continued)

*Primary Examiner* — Apu M Mofiz
*Assistant Examiner* — Oscar Wehovz
(74) *Attorney, Agent, or Firm* — Workman Nydegger (57) ABSTRACT

According to examples, an apparatus may include a processor and a memory on which are stored machine-readable instructions that when executed by the processor, may cause the processor to receive an updated data record from a data source and may determine a first conflated data record. The first conflated data record may be associated with the updated data record and include data records in a first grouping from among a plurality of data sources. The processor may identify the data records included in the first conflated data record and may generate a second conflated data record that updates conflations among the updated data record and the identified data records. The second conflated (Continued)

data record may include a second grouping of data records. The processor may replace the first conflated data record with the second conflated data record to incrementally update a set of conflated data records.

20 Claims, 7 Drawing Sheets

(56) References Cited

U.S. PATENT DOCUMENTS

| | | | | |
|---|---|---|---|---|
| 2018/0181644 | A1* | 6/2018 | Lyons | G06F 16/951 |
| 2020/0356579 | A1* | 11/2020 | Anderson | G06F 16/3338 |
| 2021/0224258 | A1* | 7/2021 | Faruquie | G06N 5/003 |

OTHER PUBLICATIONS

DBMS Cube, Retrieved From : https://docs.oracle.com/cd/E18283_01/appdev.112/e16760/d_cube.htm, Retrieved Date: Feb. 18, 2021, 21 Pages.

"Refresh Extracts", Retrieved From : https://help.tableau.com/current/pro/desktop/en-us/extracting_refresh.htm, Retrieved Date: Feb. 18, 2021, 5 Pages.

"Support Appending to Parquet Files", Retrieved From : https://issues.apache.org/jira/browse/SPARK-18199, Nov. 1, 2016, 1 Page.

Boopalan, Poovarasan, "How to Achieve Delta/Incremental Load in Alteryx", Retrieved From : https://visualbi.com/blogs/self-service-bi/alteryx/achieve-delta-incremental-load-alteryx/, Aug. 11, 2019, 4 Pages.

Estabrook, et al., "Best Practices For Using Azure Data Lake Storage Gen2", Retrieved From : https://docs.microsoft.com/en-us/azure/storage/blobs/data-lake-storage-best-practices, Dec. 6, 2008, 7 Pages.

Gupta, Rajiv, "Load Ongoing Data Lake Changes with Aws Dms and AWS Glue", Retrieved From : https://aws.amazon.com/blogs/big-data/loading-ongoing-data-lake-changes-with-aws-dms-and-aws-glue/, Jul. 1, 2019, 12 Pages.

Koby,"How Can We Improve HDInsight?", Retrieved From : https://feedback.azure.com/forums/217335-hdinsight/suggestions/13616739-add-support-for-appendblob-in-hdinsight, Apr. 27, 2016, 4 Pages.

Kranig, Simon, "CDS Based Data Extraction—Part II Delta Handling", Retrieved From : https://blogs.sap.com/2019/12/16/cds-based-data-extraction-part-ii-delta-handling/, Dec. 16, 2019, 29 Pages.

Mekterovic, "Delta View Generation for Incremental Loading of Large Dimensions in a Data Warehouse", In Proceedings of the 38th International Convention on Information and Communication Technology, Electronics and Microelectronics, May 25, 2015, pp. 1693-1698.

Zeng,et al., "iOLAP: Managing Uncertainty for Efficient Incremental OLAP", In Proceedings of the International Conference on Management of Data, Jun. 26, 2016, pp. 1347-1361.

* cited by examiner

FOLDER
STRUCTURE
400

```
<Ingestion Container>/
    |---<InstanceId>/
        |---FullSnapshots
            |<datasource >/
                |---[model.json|manifest.json]
                |---<entity>/
                    |---<snapshot-ITS>/
                        |---<filename>.[csv|parquet|...]
                        @snapshot={yyyy}-{MM}-
                        {dd}T{hh}:{mm}:{ss}.{ms}Z
        |---Incremental
            |---<datasource>/
                |---[model.json|manifest.json]
                |---<entity>/
                    |---{yyyy}/{MM}/{dd}/{hh}/
                        |---_SUCCESS
                        |---<filename>.[csv|parquet|...]
                        |---Deletes
                        |    |---_SUCCESS
                        |    |---<filename>.[csv|parquet|...]
```

FIG. 4

INCREMENTAL
UPDATE ALGORITHM
500

INPUT:
    CMP: conflation match pair table
    $\{\Delta E_i\}$: current delta input for conflation
    $\{E_i\}$: snapshot of full source entities
    AM: snapshot of full always match
    NM: snapshot of full never match
    P: conflation plan
OUTPUT:
    CMP': updated conflation match pair table
    Delta of CMP BEGIN
    {ids} = Filter($\{\Delta E_i\}$, CMP, AM, NM)ou
    (Clean, Dirty) = Split(CMP, {ids})
    $\{\Delta E_i'\}$ = Split($\{\Delta E_i\}$, {ids})
    (AM', NM') = Split((AM, NM), {ids})
    Dirty' = Match($\{\Delta E_i'\}$, AM', NM')

Return Clean ∪ Dirty'
END

INCREMENTAL UPDATES OF CONFLATED DATA RECORDS

BACKGROUND

Datasets that include data records from multiple data sources may be maintained on computing devices. The computing devices may update the data records based on updates received from the data sources.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A computing device may maintain and store data records received from a data source or from multiple data sources as a set of conflated data records. A conflated data record may be a data record in which a plurality of data records, which may be from multiple data sources, may be conflated, e.g., grouped together, unified, and/or the like into a single dataset. In addition, the set of conflated data records may be a conflation, unification, or grouping of data from multiple data sources to form the single dataset. Conflation may be defined as a mechanism that may relate or link the data records from the multiple data sources to build relationships between the data records. Data records having a similar feature, such as a common entity name, a common entity type, and/or the like, may be conflated into a single conflated data record. For instance, a data record directed to a user's name may be conflated with a data record directed to the user's spouse, the user's address, the user's email address, and/or the like, as these data records may each be directed to the same user (entity). In the present disclosure, the set of conflated data records may also be referred to as a set of grouped data records.

The computing device may receive an updated data record from a data source among a plurality of data sources and this updated data record may be incorporated in a corresponding conflated data record in the set of conflated data records. In some instances, the incorporation of the updated data record may affect one or more other data records in the set of conflated data records. By way of particular example in which the updated data record is a name of an individual, a first conflated data record may include conflated data records that include an individual's name that is the same or similar to the name as it appears in the updated data record. In some examples, the first conflated data record may include those conflated data records whose source primary keys match the ones that may be included in the updated data record.

A concern associated with maintaining a set of conflated data records may be that an update to a data record in a conflated data record may change conflations (e.g., correlations, groupings, links, etc.) among the updated data record and other data records included in the conflated data record. Such data records may be referred to as being "dirty", and in some instances, not all of the "dirty" data records may be processed. In this regard, "clean" data records may refer to remaining data records in the set of conflated data records, other than the "dirty" data records, that may not need to be re-processed. In some instances, it may not be possible to accurately update conflated data records directly by undoing a previous conflation on "dirty" data records and redoing a conflation with updated data records. For instance, while applying updates to particular data records in the set of conflated data records may be possible, in many of these instances, the updates may not be applied to all associated data records in the set of conflated data records and, in some instances, may require recursively regrouping the data records due to the changes and how conflation of data records may be defined, which may result in inaccuracies in the updated set of conflated data records. In these instances, the resulting set of conflated data records may not be equivalent to a set of conflated data records resulting from a full refresh of the set of conflated data records.

In some instances, a full refresh may be performed to ensure accuracy of the set of conflated data records. However, a full refresh may be time and/or computing resource intensive, particularly in instances in which the set of conflated data records includes a large volume of data. In some instances, data sources may have a relatively small number of updates in a given period of time when compared to the size of the entire dataset. In these instances, it may be relatively inefficient to perform a full refresh of the set of conflated data records, which may involve a relatively large amount of time and/or computing resources.

Disclosed herein are apparatuses, systems, methods, and computer-readable media that may enable efficient updates to the set of conflated data records by, for instance, enabling incremental updates to the set of conflated data records while accurately conflating the data records in the set of conflated data records. As discussed herein, a processor may receive an updated data record from a data source, in which the updated data record may be associated with a first conflated data record among the set of conflated data records. The first conflated data record may be a conflation or unification of data records in a first grouping from a plurality of data sources. The processor may determine the first conflated data record among the set of conflated data records. As also discussed herein, incorporation of the updated data record may change conflations among the updated data record and the other data records in the first conflated data record, which may cause the first conflated data record to become "dirty".

In some examples, the processor may generate an updated conflated data record to replace the "dirty" conflated data record. The processor may identify, from information corresponding to the plurality of data sources, the data records included in the first conflated data record. The processor may generate a second conflated data record that updates the conflations among the updated data record and the identified data records. The second conflated data record may have a second grouping of data records. For instance, the second conflated data record may have a different or updated grouping of data records from the plurality of data sources, may include different data records than those included in the first conflated data record, and/or the like. The processor may replace the first conflated data record with the second conflated data record in the set of conflated data records to incrementally update the set of conflated data records.

Through implementation of the features of the present disclosure, a processor may enable improved updates to the conflated dataset, which may reduce latency and consumption of processing resources, for instance, by use of incremental updates rather than a full refresh of the conflated dataset. In some examples, the improved updates may increase the accuracy and the consistency associated with incremental processing of updates by leveraging other data records that may be relevant to or associated with the updated data record and re-processing conflated data records that include these relevant or associated data records together with the current update.

Figure 1:
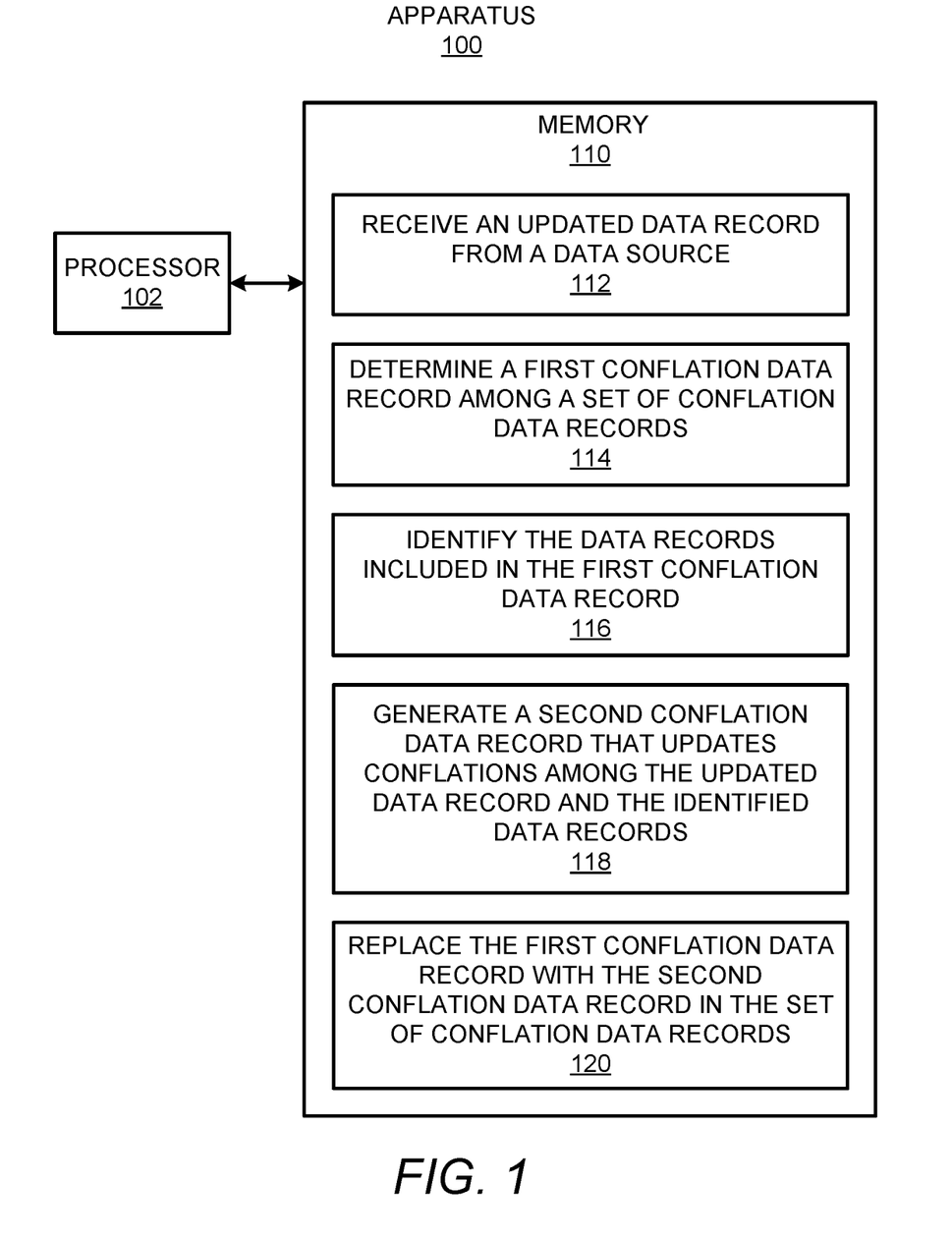
FIG. 1 depicts a block diagram of an apparatus that may receive an updated data record, determine a first conflated data record among a set of conflated data records, generate a second conflated data record that updates conflations of data records, and replace the first conflated data record with the second conflated data record to incrementally update the set of conflated data records, in accordance with an embodiment of the present disclosure.
Figure 2:
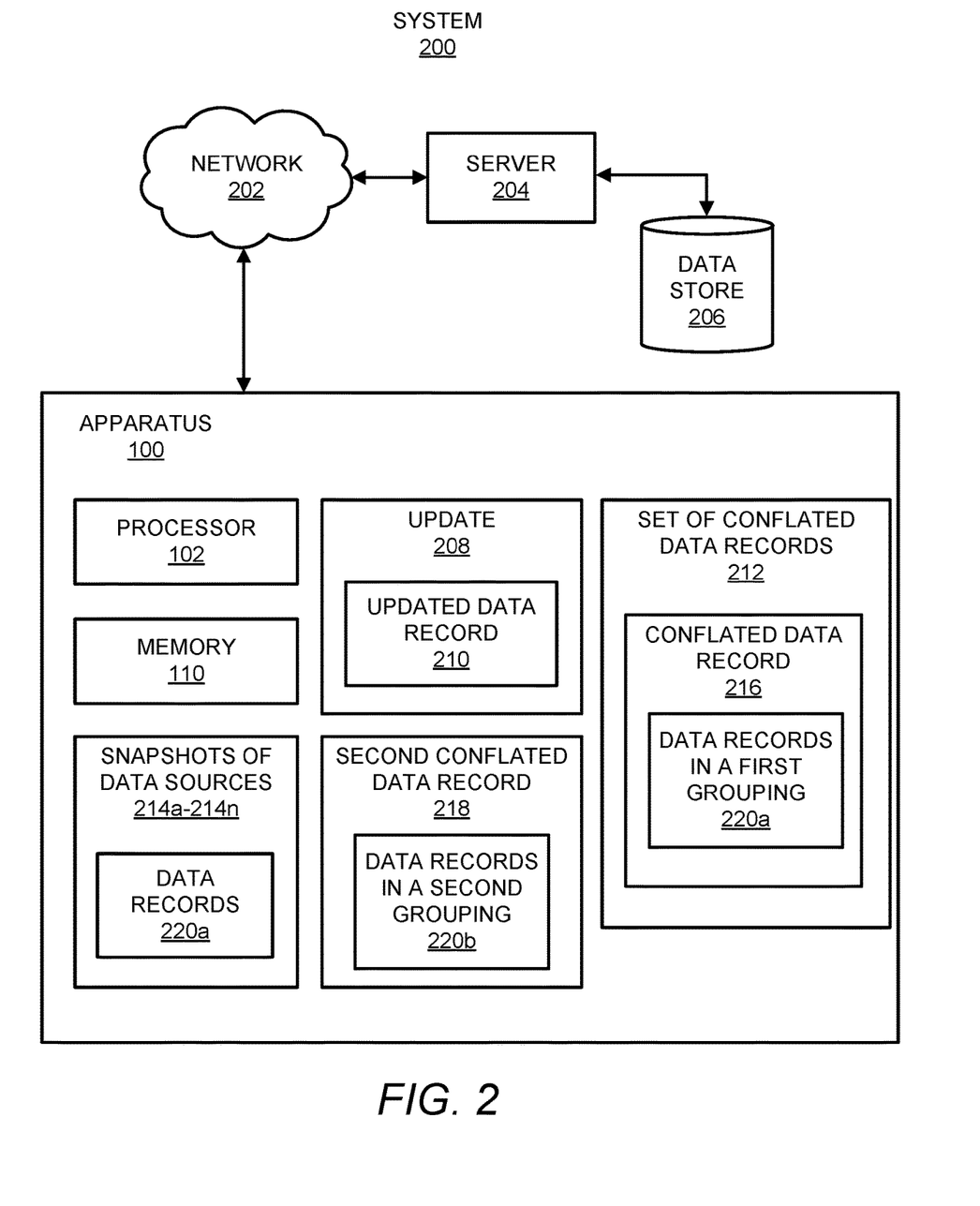
FIG. 2 shows a block diagram of a system within which the apparatus depicted in FIG. 1 may be implemented, in accordance with an embodiment of the present disclosure.
Figure 3:
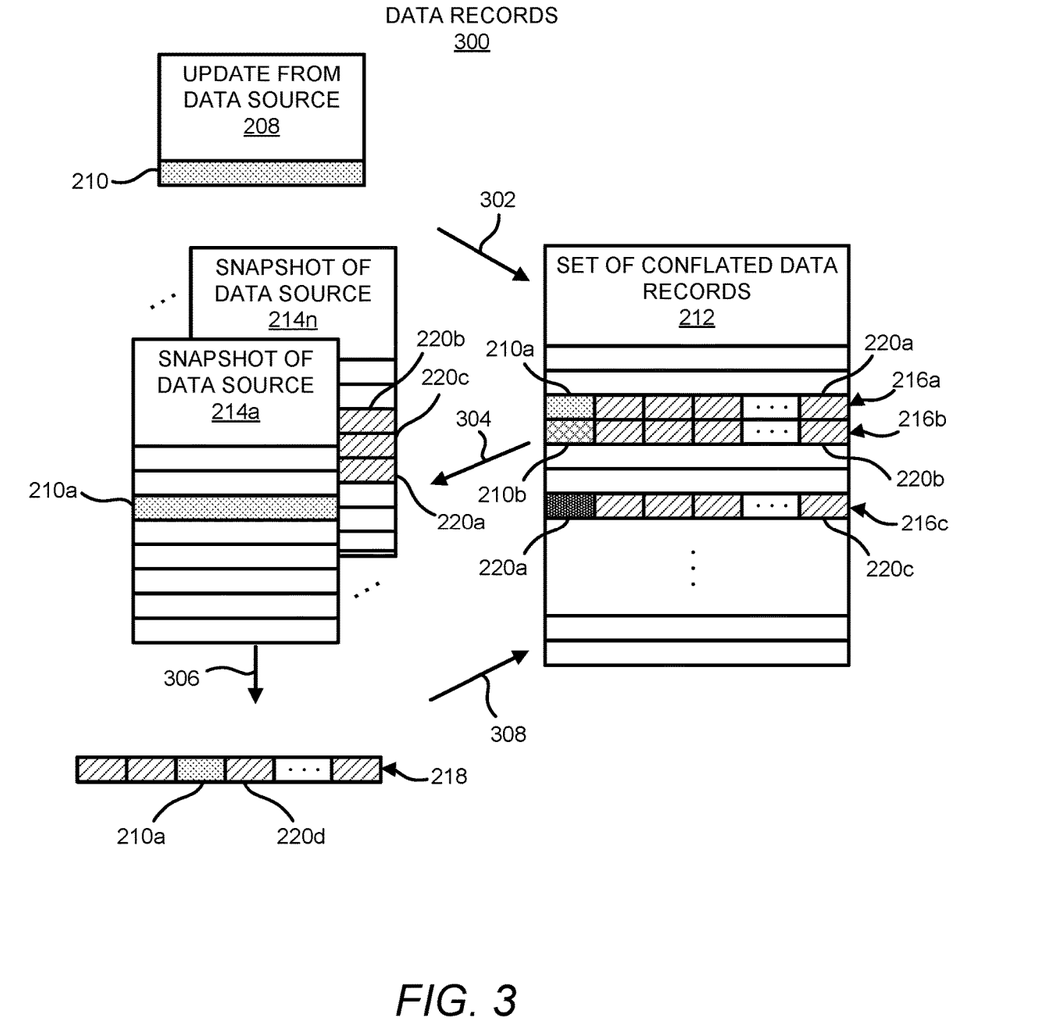
FIG. 3 shows a block diagram of example data records, which may be implemented in the system depicted in FIG. 2, including an updated data record, a set of conflated data records including a first conflated data record, and a second conflated data record to incrementally update the set of conflated data records, in accordance with an embodiment of the present disclosure.

Reference is made to FIGS. 1, 2, and 3. FIG. 1 shows a block diagram of an apparatus 100 that may receive an updated data record, determine a first conflated data record among a set of conflated data records, generate a second conflated data record that updates conflations of data records, and replace the first conflated data record with the second conflated data record to incrementally update the set of conflated data records, in accordance with an embodiment of the present disclosure. FIG. 2 shows a block diagram of an example system 200 that may include the apparatus 100 depicted in FIG. 1, in accordance with an embodiment of the present disclosure. FIG. 3 shows a block diagram of example data records 300, which may be implemented in the system 200 depicted in FIG. 2, including an updated data record, a set of conflated data records including a first conflated data record, and a second conflated data record to incrementally update the set of conflated data records, in accordance with an embodiment of the present disclosure. It should be understood that the apparatus 100 depicted in FIG. 1, the system 200 depicted in FIG. 2, and/or the data records 300 depicted in FIG. 3 may include additional features and that some of the features described herein may be removed and/or modified without departing from the scopes of the apparatus 100, the system 200, and/or the data records 300.

The apparatus 100 may include a processor 102 and a memory 110. The apparatus 100 may be a computing device, including a server, a node in a network (such as a data center or a cloud computing resource), a desktop computer, a laptop computer, a tablet computer, a smartphone, an electronic device such as Internet of Things (IoT) device, and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-120 to update a set of conflated data records based on an updated data record received from a data source. The instructions 112-120 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-120.

The apparatus 100 may be connected via a network 202, which may be the Internet, a local area network, and/or the like, to a server 204. In addition, a data store 206 may be connected to the server 204. In some examples, the server 204 may maintain a data source (not shown), such as a cloud-based data warehouse, data center, and/or the like. In addition, the apparatus 100 may maintain a table of data records that may be a conflation of the data from multiple data sources.

The processor 102 may fetch, decode, and execute the instructions 112 to receive an update 208 including an updated data record 210 from a data source (not shown). The update 208 may include instructions to insert a new data record, modify an existing data record, or delete a data record. The update 208 may be an update for a predetermined time period, a periodic update, or the like.

The processor 102 may generate and store snapshots 214a to 214n of the data sources, which may be a record of a state of the data source at a particular point in time. The snapshots 214a to 214n of the data sources may include a plurality of snapshots 214a to 214n corresponding to the plurality of data sources. The snapshots 214a to 214n may be full snapshots of the data sources, which may be formed using incremental updates received from the data sources over time. The processor 102 may append incremental updates from the data sources to the snapshots 214a to 214n to maintain up-to-date copies of the data sources at the apparatus 100. In some examples, the update 208 may be an incremental update that is received from a data source after a corresponding snapshot 214a of the data source is generated.

The processor 102 may maintain both the snapshots 214a to 214n of the data sources and previous updates from the data sources and may apply the updates to the set of conflated data records 212. The processor 102 may store the snapshots 214a to 214n and the previous updates in a predetermined folder structure at the apparatus 100.

The processor 102 may track different updates via timestamps. For instance, the processor 102 may maintain a timestamp for the update 208, which may track the time period associated with the current update, such as at a time t. The processors 102 may also maintain time stamps for the snapshots 214a to 214n, in which the time stamps may identify when the snapshots 214a to 214n were generated, for instance, a period up to the current update, such as at time t−1. Based on the timestamps, the processor 102 may track and append each incremental update to the snapshots 214a to 214n to keep the snapshots 214a to 214n up to date.

In some examples, a data source that is maintained at the server 204 may be one among a plurality of data sources. The processor 102 may conflate, e.g., bring together, group, combine, unify, or the like, the data from the multiple data sources into a set of conflated data records, for instance the set of conflated data records 212, via updates from each of the multiple data sources.

Figure 4:
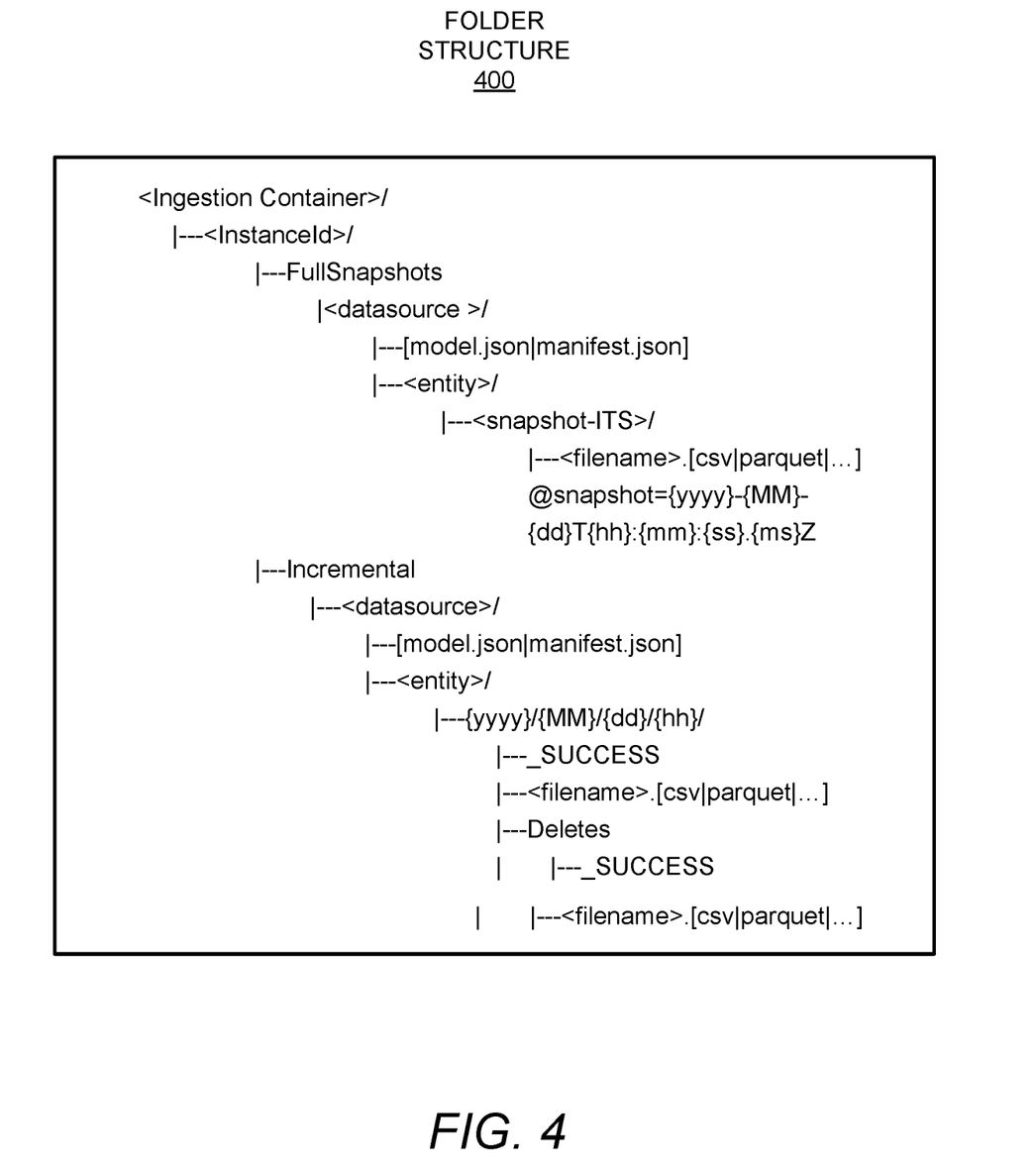
FIG. 4 shows a diagram of an example folder structure to maintain a full snapshot of a data source and incremental updates to implement incremental ingestion of updates, in accordance with an embodiment of the present disclosure.

By way of particular example and for purposes of illustration, the processor 102 may use a folder structure 400 as depicted in FIG. 4 to maintain both full snapshots of the data sources and incremental updates to implement incremental ingestion of updates. In this example, the {yyyy}-{MM}-{dd}-{hh} may indicate all partition files within that folder having an incremental time stamp (ITS)>={yyyy}-{MM}-{dd}-{hh}, where {yyyy}, {MM}, {dd}, and {hh} represent year, month, day, and hour, respectively. The processor 102 may maintain folders to the {hh} level, for instance, for cases in which the highest frequency for incremental refresh is hourly.

In some examples, the incremental partition files may have a LastUpdateTimestamp (ETS) column to indicate when an update, insert, or delete operation was performed. In some examples, in the Delete partition folder, the processor 102 may set the files to have the same schema as the files in the {hh} partition folder. By way of particular example, for manifest.json, the partition section may point to just the {hh} partition folder with filenames. The processor 102 may consider these to be update and insert (upserts) partitions. In some instances, if there exists a Delete folder in {hh}, the processor 102 may consider all files in the Delete folder as delete actions.

The processor 102 may fetch, decode, and execute the instructions 114 to determine a conflated data record 216 among the set of conflated data records 212 that may be associated with the updated data record 210. As shown in FIG. 3, the conflated data record 216 may include multiple conflated data records 216a, 216b, and 216c as described in further detail herein. In some examples, the processor 102 may use the updated data record 210 to update, insert, or delete a first data record 210a in the first conflated data record 216a. The first data record 210a may be a data record in the set of conflated data records 212 that matches the updated data record 210. In some examples, the processor 102 may filter the set of conflated data records 212 to find the first conflated data record 216a that includes the first data record 210a that matches the updated data record 210, as depicted by arrow 302 in FIG. 3.

In some examples, the processor 102 may also determine data records among the set of conflated data records 212 that may be associated with, and thus may be affected by the updated data record 210, such as an associated conflated data record 216b. By way of particular example in which the update 208 is an update to change an individual's name from "Jonathan Smith" to "Jon Smith", the first conflated data record 216a may include the first data record 210a having the updated individual's name "Jon Smith". In some examples, the processor 102 may determine other data records, such as the associated conflated data record 216b that may include a second data record 210b having a variation of the individual's name, such as "Jonathan S.", "Jon S.", "Jonathan M. Smith", and/or the like.

In some examples, the processor 102 may apply a filter to the set of conflated data records 212 to determine the associated conflated data record 216b that may include the second data record 210b associated with the first data record 210a. For instance, the processor 102 may apply a user-defined rule to control how the filter may identify data records that are considered to be associated with the updated data record 210. In some examples, the processor 102 may display a user interface (UI) for setting a variety of rules. A rule for the filter may be associated with a level of precision of a match between the first data record 210a and the second data record 210b in the associated conflated data record 216b. By way of particular example and for purposes of illustration, the level of precision for a match to the first data record 210a may be a direct match, in which the processor 102 may identify only the first data record 210a that may be a direct match with the updated data record 210. Alternatively or additionally, the processor 102 may apply a level of precision for a match across different formats of the updated data record 210 and the associated data records 210b in the associated conflated data record 216b, such as different spellings, inclusion of initials, and/or the like. In some examples, the processor 102 may apply fuzzy matching techniques between the updated data record 210 and other data records included in the set of conflated data records 212 to filter the set of conflated data records 212.

Continuing with the example in which the update 208 is to update an individual's name, for a level of precision for an exact match, the processor 102 may filter the set of conflated data records 212 to determine only the first conflated data record 216a, which may include an exact match of the updated name "Jon Smith". Alternatively or additionally, for a different level of precision for the filter, the processor 102 may filter the set of conflated data records 212 to identify content of data records having different formats or variations of the individual's name as being associated with the updated data record 210, such as the data record 210b which may include "Jonathan S.", "Jon S.", "Jonathan M. Smith", and/or the like. As such, based on the set rule and the associated level of precision of a match with the updated data record 210, the fidelity or sensitivity of the filter may be changed, and thus a number of conflated data records identified as being associated with the updated data record 210 may be varied. It should be understood that, while a particular example for a rule for filtering different formats and variations of an individual's name is described herein for illustration purposes, the processor 102 may define various types of rules, which may be associated with various types and characteristics of the data in the data records.

The processor 102 may fetch, decode, and execute the instructions 116 to identify, from information corresponding to the plurality of data sources, the data records 220a included in the conflated data record 216. In some examples, the updated data record 210 and the other data records 220a included in the first conflated data record 216a may have a predetermined correlation when the data from the data sources is conflated to form the set of conflated data records 212. In some examples, the data records 220a that are included in the first conflated data record 216a may be data records from a plurality of different data sources, which may be conflated together to form the first conflated data record 216a. The correlation between the data records 210a, 220a may be determined based on a conflation plan and/or the conflation algorithm implemented for conflation. In this regard, once the updated data record 210 is updated, the correlation between the data records 210a and 220a in the first conflated data record 216a may no longer be valid, and the processor 102 may identify the first conflated data record 216a as being "dirty". As such, in order to generate an updated conflated data record to replace the "dirty" conflated data record, the processor 102 may identify each data record 220a included in the conflated data record 216 from the data source for re-processing for conflation, as depicted by arrow 304 in FIG. 3. In this regard, the information corresponding to the plurality of data sources for identifying the source data records may include snapshots 214a to 214n of previous updates received from the plurality of data sources, which may be stored on the apparatus 100. Alternatively or additionally, the information corresponding to the plurality of data sources for identifying the data records 220a may be obtained directly from the data sources, such as the server 204, which may be hosting the data sources.

In some examples, the processor 102 may use primary keys (not shown) associated with each data record 220a to identify the data records 220a in the snapshots 214a to 214n. In this regard, each data record 220a, 210a included in the first conflated data record 216a may include a primary key. The primary key may be unique to each data record and may be used to identify the data record in the snapshots 214a to 214n. In this regard, the processor 102 may apply a primary key based filter to the snapshots 214a to 214n of the plurality of data sources to identify the data records 220a included in the first conflated data record 216a. In some examples, the data records 220a included in the first conflated data record 216a may be identified from one or more than one of the snapshots 214a to 214n.

In some examples, the processor 102 may fetch, decode, and execute the instructions 118 to generate a second conflated data record 218 that updates conflations among the updated data record 210 and the identified data records 220a. The second conflated data record 218 may include the updated data record 210 and a second grouping of data records 220b. In this regard, the data records 220b in the second grouping may include one or more of the data records 220a in the first grouping, which may be selected according to the updated conflation. For instance, the processor 102 may generate the second conflated data record 218 to include the updated data record 210a, which may be the same as the updated data record 210, and a group of data records 220d, which may be a selected set of data records among the identified data records 220a or 220b, as depicted by arrow 306 in FIG. 3. In some examples, the data records 220a or data records 220b may be data records whose source data records are from multiple data sources, and which may be identified using multiples ones of the snapshots 214a to 214n. The processor 102 may group the updated data record 210a and selected ones of the identified data records 220a in the second grouping based on the updates to the conflations among the updated data record 210 and the identified data records 220a to generate the second conflated data record 218. The processor 102 may determine the updated conflation by re-processing the identified data records 220a, including the updated data record 210a, according to a conflation algorithm and/or a conflation plan. As such, the updated data record 210a may cause the second grouping for the second conflated data record 218 to be different than the first grouping for the first conflated data record 216.

In some examples, the processor 102 may repeat the process for gathering associated conflated data records in the set of conflated data records 212 in order to identify additional data records to recursively re-process for conflation. The processor 102 may determine an additional conflated data record 216c in the set of conflated data records 212, which may be affected by the updated data record 210a. For instance, the accuracy of the incremental updates to the set of conflated data records 212 may be improved with greater numbers of data records that are re-processed, up to a full refresh, at the cost of speed and efficiency of the updates. In this regard, the processor 102 may identify data records 220a included in the first conflated data record 216a, and may determine the additional conflated data record 216c from the plurality of data sources based on the identified data records 220a. In this regard, the processor 102 may generate the second conflated data record 218 to also include the identified additional data records 220c from the additional conflated data record 216c.

The processor 102 may fetch, decode, and execute the instructions 118 to replace the first conflated data record 216 with the second conflated data record 218 in the set of conflated data records 212 to incrementally update the set of conflated data records 212, as depicted by arrow 308 in FIG. 3. In some examples, the processor 102 may designate the conflated data records 216a, 216b, and/or 216c as "dirty", and may delete these data records from the set of conflated data records 212. The processor 102 may replace the "dirty" conflated data records 216a, 216b, and/or 216c with updated conflated data records, for instance the second conflated data record 218 that updates the correlations among the updated data record 210 and the identified data records 220b. While the various data records in the present description, such as the updated data record 210, the conflated data records 216a, 216b, 216c, the second conflated data record 218, and/or the like, are described as a single data record simply for ease of description and clarity, it should be understood that the various data records may include a large number of data records.

As described herein, the set of conflated data records 212 may be a unification or a conflation of data records from a plurality of data sources. By way of particular example and for purposes of illustration, the processor 102 may incrementally update a conflation match pair table (CMP), such as the set of conflated data records 212, based on a current delta input for conflation ($\Delta E_i$), such as the update 208, using an incremental update algorithm 500 depicted in FIG. 5.

Figure 5:
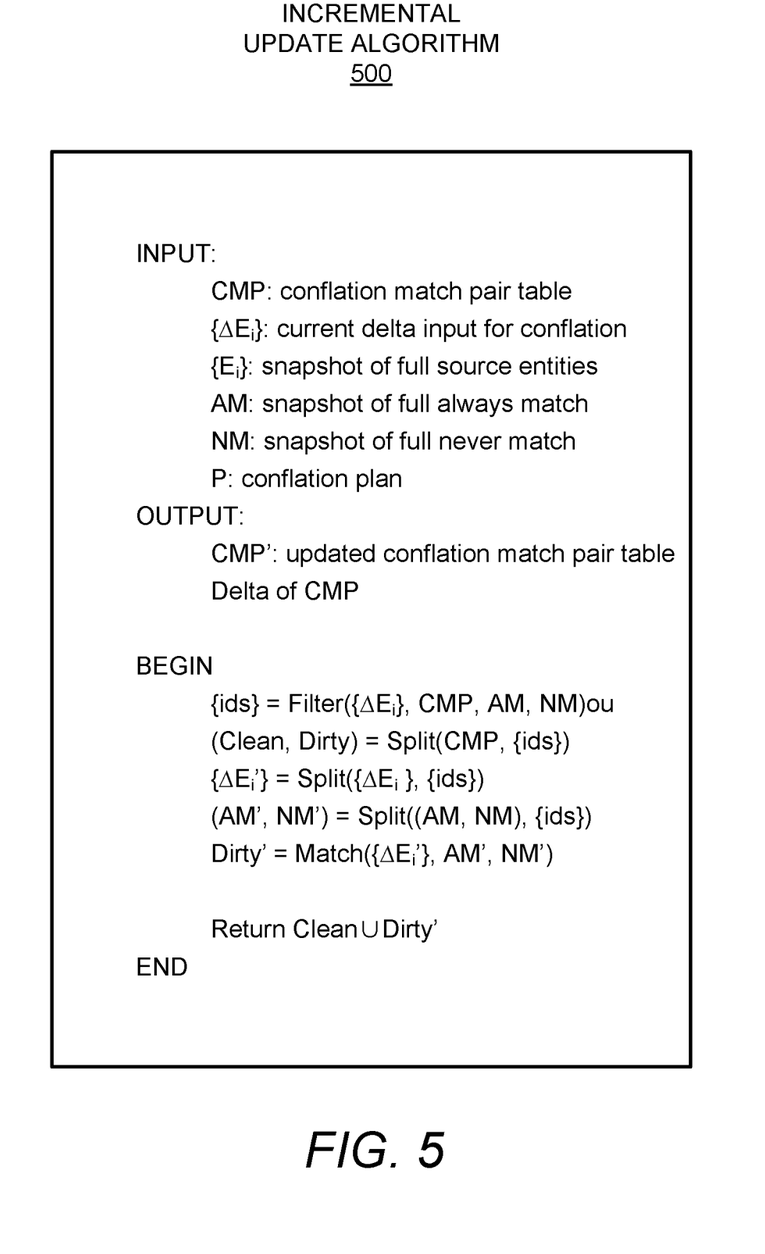
FIG. 5 shows a diagram of an example incremental update algorithm to incrementally update a set of conflated data records, such as an conflation match pair table (CMP), based on a current delta input for conflation, such as the first update depicted in FIGS. 2 and 3, in accordance with an embodiment of the present disclosure.

In this example, the processor 102 may apply the Filter operation to identify an extended list of data records to reprocess. Given $\Delta E_i$, the processor 102 may have a list of primary keys for data records from the data source to be processed. Based on CMP, AM, NM, the processor 102 may compute the extended list of such primary keys {ids}, such as the first conflated data record 216 depicted in FIGS. 2 and 3. The processor 102 may use the extended list of primary keys to identify the candidate list of data records for which the processor 102 may redo the match.

In some examples, the processor 102 may use the filter to control to what extent to redo the match. For instance, the processor 102 may use the filter to control a tradeoff between quality of conflation vs. speed/efficiency. The Filter operation may rely on both primary keys in {$\Delta E_i$}, CMP, AM, NM, as well as a fuzzy match of data records that may have new primary keys against existing CMP. With this additional fuzzy match step, the processor 102 may handle the data records that may include new primary keys, but which should be clustered with existing records.

Figure 6:
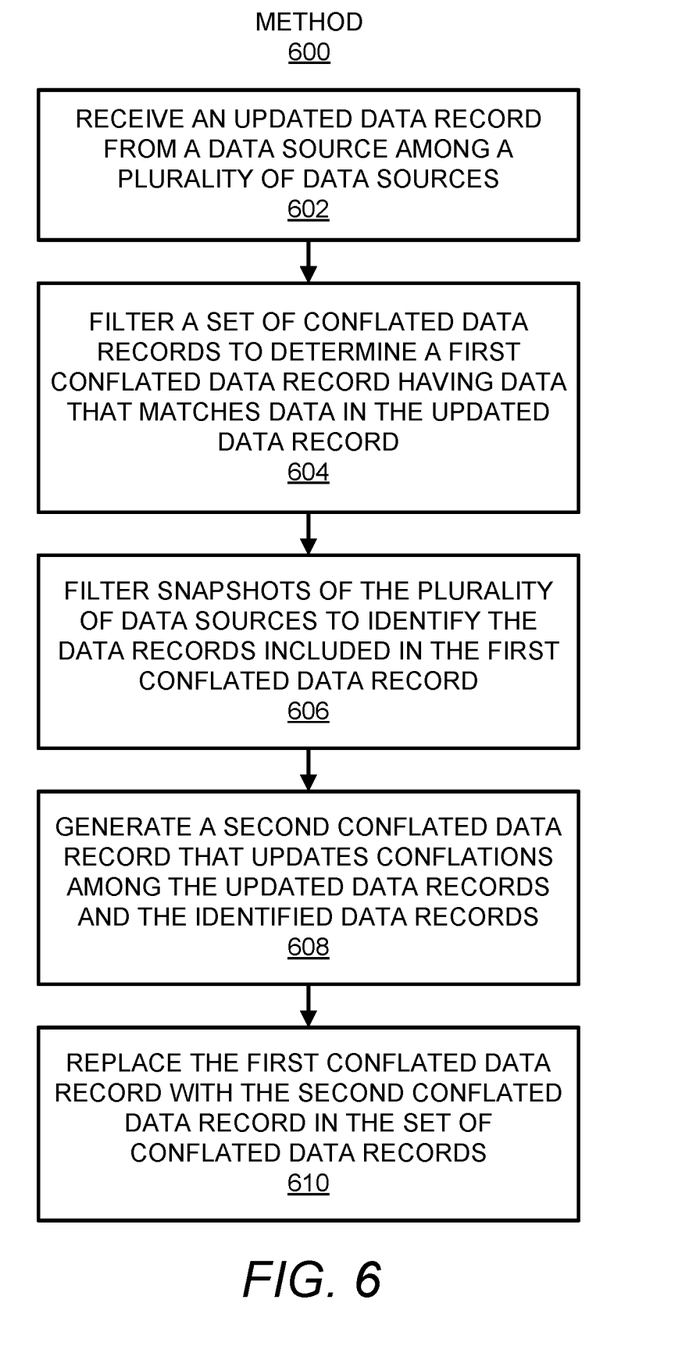
FIG. 6 shows a flow diagram of a method for replacing a first conflated data record in a set of conflated data records with a second conflated data record to incrementally update the set of conflated data records, in accordance with an embodiment of the present disclosure.

Various manners in which a processor implemented on the apparatus 100 may operate are discussed in greater detail with respect to the method 600 depicted in FIG. 6. FIG. 6 depicts a flow diagram of a method 600 for replacing a first conflated data record in a set of conflated data records with a second conflated data record to incrementally update the set of conflated data records, in accordance with an embodiment of the present disclosure. It should be understood that the method 600 depicted in FIG. 6 may include additional operations and that some of the operations described therein may be removed and/or modified without departing from the scope of the method 600. The description of the method 600 is made with reference to the features depicted in FIGS. 1, 2, and 3 for purposes of illustration.

At block 602, the processor 102 may receive an updated data record, such as the updated data record 210 in the update 208 depicted in FIG. 3, from a data source among a plurality of data sources from which the processor 102 is to receive data records.

At block 604, the processor 102 may filter a set of conflated data records, such as the set of conflated data records 212 depicted in FIG. 3, to determine a first conflated data record 216a having data that matches data in the updated data record 210. In this regard, the data record 210a in the first conflated data record 216a may be the same as the updated data record 210.

The first conflated data record 216a may include data records 220a from among the plurality of data sources arranged in a first grouping. At block 606, the processor 102 may filter snapshots of the plurality of data sources, such as snapshots 214a to 214n depicted in FIG. 3, to identify the data records 220a included in the first conflated data record 216a.

At block 608, the processor 102 may generate a second conflated data record, such as the second conflated data record 218 depicted in FIG. 3, that may update correlations among the updated data record 210a and the identified data records 220a. In this regard, the processor 102 may re-process the updated data record 210a and the identified data records 220a according to a conflation algorithm to update the correlations. The generated second conflated data record 218 may include the updated data record 210a and data records 220b, which may be selected ones of the identified data records 220a according to the updated correlations.

In some examples, the processor 102 may filter the set of conflated data records 212 based on a rule to determine associated conflated data records for re-processing, such as the first conflated data record 216a and/or associated conflated data record 216b. The rule may be a user-defined rule that is associated with a level of precision of a match between the updated data record 210a and the data records 220a, 220b included in the first conflated data record 216a and the associated conflated data record 216b.

In some examples, the matched data in the associated conflated data record 216b, such as data in data record 210b, may have a format that is different from data in the first data record 210a. In this regard, the processor 102 may filter the set of conflated data records 212 based on a level of precision of a match between the different formats of the data in the first data record 210a and the data in the data record 210b in the associated conflated data record 216b.

In some examples, the processor 102 may determine the associated conflated data record 216b among the set of conflated data records 212 based on fuzzy matching between the updated data record 210 and the data records 210b included in the set of conflated data records 212.

In some examples, the snapshots 214a to 214n of the plurality of data sources may include previous updates received from the plurality of data sources. The processor 102 may generate and maintain a snapshot 214a to 214n for each of the plurality of data sources. For each of the data sources, the processor 102 may update the corresponding snapshot 214a to 214n by appending new incremental updates to the previous incremental updates from a particular data source. The processor 102 may use the updated snapshots 214a to 214n to process subsequent updates from respective ones of the plurality of data sources.

In some examples, the processor 102 may determine primary keys associated with the data records 220a included in the first conflated data record 216a. The processor 102 may identify the data records 220a included in the first conflated data record 216a in the snapshots 214a to 214n based on the primary keys.

In some examples, the processor 102 may group the updated data record 210a and the identified data records 220a, 220b in a second grouping based on the updates to the correlations among the updated data record 210a and the identified data records 220a, 220b to generate the second conflated data record 218. In this regard, the second conflated data record 218 may include the updated data record 210a, which may be the same as the updated data record 210, and data records 220d, which may be selective ones of the identified data records 220a, 220b that may be grouped based on an updated correlation for conflation due to the updated data record 210. The second grouping in the second conflated data record 218 may be different from the first grouping in the first conflated data record 216a and the associated conflated data record 216b based on the updated correlation.

In some examples, based on the identified data records 220a, 220b included in the first conflated data record 216a and the associated conflated data record 216b, the processor 102 may determine an additional conflated data record 216c in the set of conflated data records 212. For instance, the processor 102 may use the data records 220a, 220b identified in the snapshots 214a to 214n to determine, in the set of conflated data records 212, additional data records for re-processing, such as data records 220c included in the additional conflated data record 216c. The processor 102 may then identify the additional data records 220c included in the additional conflated data record 216c from the snapshots 214a to 214n of the plurality of data sources and may generate the second conflated data record 218 to include selective ones of the identified additional data records 220c in addition to the identified data records 220a and 220b.

Some or all of the operations set forth in the method 600 may be included as utilities, programs, or subprograms, in any desired computer accessible medium. In addition, the method 600 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 7:
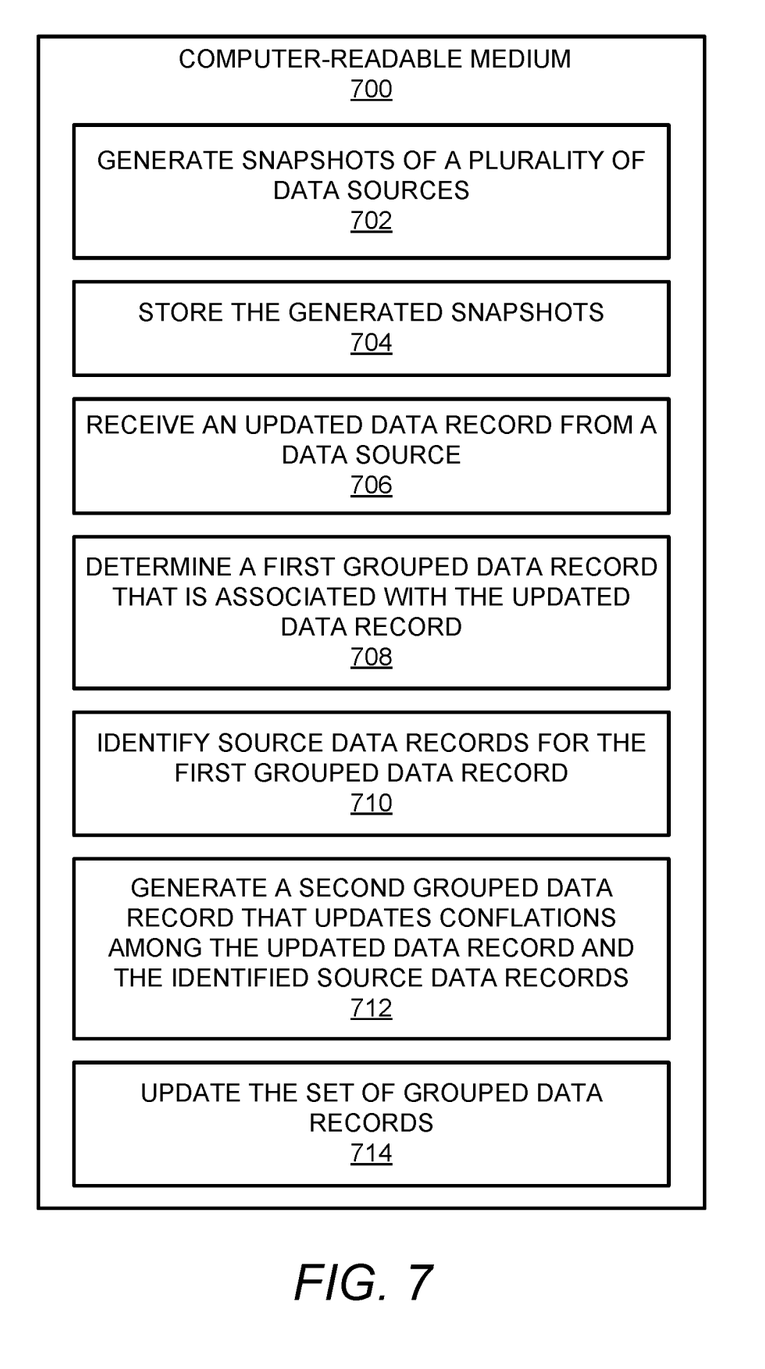
FIG. 7 depicts a block diagram of a computer-readable medium that may have stored thereon computer-readable instructions to generate snapshots of a plurality of data sources, determine a first grouped data record that is associated with an updated data record, generate a second grouped data record based on identified source data records from the generated snapshots, and update a set of grouped data records to replace the first grouped data record with the second grouped data record to incrementally update the set of grouped data records, in accordance with an embodiment of the present disclosure.

Turning now to FIG. 7, there is shown a block diagram of a computer-readable medium 700 that may have stored thereon computer-readable instructions to generate snapshots of a plurality of data sources, determine a first grouped data record that is associated with an updated data record, generate a second grouped data record based on identified source data records from the generated snapshots, and update a set of grouped data records to replace the first grouped data record with the second grouped data record to incrementally update the set of grouped data records, in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The description of the computer-readable medium 700 is made with reference to the features depicted in FIGS. 1, 2, and 3 for purposes of illustration. The computer-readable medium 700 may be a non-transitory computer-readable medium. The term "non-transitory" does not encompass transitory propagating signals.

The computer-readable medium 700 may have stored thereon machine-readable instructions 702-714 that a processor disposed in an apparatus 100 may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to generate snapshots 214a to 214n of a plurality of data sources that may include previous updates to a set of grouped data records, such as the set of conflated data records 212 depicted in FIG. 3, from the plurality of data sources. The processor may fetch, decode, and execute the instructions 704 to store the generated snapshots 214a to 214n of the plurality of data sources. The snapshots 214a to 214n may be generated and stored locally on the apparatus 100.

The processor may fetch, decode, and execute the instructions 706 to receive an update 208 from a data source among the plurality of data sources. The update may include an updated data record 210.

The processor may fetch, decode, and execute the instructions 708 to determine, through application of a filter on the set of grouped data records 212, a first grouped data record, such as the first conflated data record 216a depicted in FIG. 3. The first grouped data record 216a may be associated with the updated data record 210 and may include other data records, such as data records 220a depicted in FIG. 3, from among the plurality of data sources. The first grouped data record 216a may include an updated data record 210a, which may be the same as the updated data record 210.

The processor may fetch, decode, and execute the instructions 710 to identify source data records for the first grouped data record 216a from the generated snapshots 214a to 214n, such as data records 220a, 220b in snapshots 214a to 214n depicted in FIG. 3.

The processor may fetch, decode, and execute the instructions 712 to generate a second grouped data record, such as the second conflated data record 218, that may update conflations among the updated data record 210a and the identified source data records 220a, 220b in the snapshots 214a to 214n.

The processor may fetch, decode, and execute the instructions 714 to update the set of grouped data records 212 to replace the first grouped data record 216a with the second grouped data record 218 to incrementally update the set of grouped data records 212.

In some examples, the processor may filter the set of grouped data records 212 based on a rule to determine the first grouped data record 216a and/or an associated grouped data record 216b. The rule may be a user-defined rule that may be associated with a level of precision of a match between the updated data record 210a and the data records 220a, 220b included in the grouped data records 216a, 216b.

The processor may determine primary keys associated with the data records 220a, 220b included in the grouped data records 216a, 216b. The processor may identify the source data records 220a, 220b for the grouped data records 216a, 216b from the snapshots 214a to 214n based on the primary keys.

In some examples, the processor may generate the second grouped data record 218 by grouping the updated data record 210a and the identified source data records 220a, 220b based on the updates to the correlations among the updated data record 210a and the identified data records 220a, 220b to generate the second grouped data record 218. The second grouped data record 218 may include the updated data record 210a and selective ones of the identified source data records 220a, 220b based on the updated correlation. In this regard, a grouping in the second grouped data record 218 may be different from a grouping of the data records 220a, 220b in the grouped data records 216a, 216b based on the updated correlation due to the updated data record 210a.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
receive an update for a data record in a dataset, the dataset comprising data records, from a plurality of data sources, arranged as a set of conflated data records in a plurality of groupings of data records;
determine a first conflated data record that includes the data record among the set of conflated data records in the dataset, the first conflated data record comprising the data record to be updated and other data records in a first grouping among the plurality of groupings of data records;
identify, in snapshots corresponding to the plurality of data sources, the data record to be updated and the other data records comprised in the first conflated data record, the snapshots being copies of the plurality of data sources at particular points in time;
update a conflation for the data record based on the update to generate an updated conflated data record for the data record, the updated conflated data record comprising a second grouping of data records correlated to the data record after the update is applied, the data records in the second grouping of data records being identified in the snapshots of the plurality of data sources to generate the updated conflated data record; and
replace the first conflated data record with the updated conflated data record in the set of conflated data records of the dataset to incrementally update the dataset.

2. The apparatus of claim 1, wherein the instructions cause the processor to:
filter the set of conflated data records based on a rule to determine the first conflated data record including a first data record that matches the updated data record, the rule being a user-defined rule that is associated with a level of precision of a match between the updated data record and the data records comprised in the first conflated data record.

3. The apparatus of claim 2, wherein a content of the data records comprised in the first conflated data record has a format that is different from a content of the updated data record, and wherein the instructions cause the processor to:
determine the first conflated data record in the set of conflated data records based on a level of precision of a match between the different formats of the updated data record and the data records comprised in the first conflated data record.

4. The apparatus of claim 1, wherein the instructions cause the processor to:
determine the first conflated data record among the set of conflated data records based on fuzzy matching between the updated data record and the data records comprised in the set of conflated data records.

5. The apparatus of claim 1, wherein the snapshots comprise previous updates received from the plurality of data sources.

6. The apparatus of claim 1, wherein the instructions cause the processor to:
determine primary keys associated with the data records comprised in the first conflated data record; and
identify the data records in the first conflated data record based on the primary keys.

7. The apparatus of claim 1, wherein the instructions cause the processor to:
group the updated data record in the second grouping based on the updates to the conflations among the updated data record and the identified other data records to generate the updated conflated data record, the second grouping being different from the first grouping.

8. The apparatus of claim 1, wherein, based on the identified other data records comprised in the first conflated data record, the instructions cause the processor to:
determine another conflated data record in the set of conflated data records;
identify additional data records comprised in the another conflated data record from the snapshots corresponding to the plurality of data sources; and
reprocess conflations for the identified additional data records.

9. A method comprising:
receiving, by a processor, an update for a data record to update a data record in a dataset, the dataset comprising data records, from a data source among a plurality of data sources from which the processor is to receive data records, arranged as a set of conflated data records in a plurality of groupings of data records;
filtering, by the processor, the set of conflated data records to determine a first conflated data record including the data record having data that matches data in the update, the first conflated data record comprising the data record to be updated and other data records arranged in a first grouping among the plurality of groupings of data records;
filtering, by the processor, snapshots of the plurality of data sources to identify the data record to be updated and the other data records comprised in the first conflated data record, the snapshots being copies of the plurality of data sources at particular points in time;
updating, by the processor, a conflation for the data record based on the update to generate an updated conflated data record for the data record, the updated conflated data record comprising a second grouping of data records correlated to the data record after the update is applied, the data records in the second grouping of data records being identified in the snapshots of the plurality of data sources to generate the updated conflated data record; and
replacing, by the processor, the first conflated data record with the updated conflated data record in the set of conflated data records of the dataset to incrementally update the dataset.

10. The method of claim 9, further comprising:
filtering the set of conflated data records based on a rule to determine the first conflated data record including the data record, the rule being a user-defined rule that is associated with a level of precision of a match between the update for the data record and the data records comprised in the set of conflated data records.

11. The method of claim 10, wherein matched data in the first conflated data record has a format that is different from data in update for the data record, and wherein the method further comprises:
filtering the set of conflated data records based on a level of precision of a match between the different formats of the data in the update for the data record and the data in the set of conflated data records.

12. The method of claim 9, further comprising:
  determining the first conflated data record among the set of conflated data records based on fuzzy matching between the update for the data record and the data records comprising the set of conflated data records.

13. The method of claim 9, wherein the snapshots of the plurality of data sources comprise previous updates received from the plurality of data sources.

14. The method of claim 9, further comprising:
  determining primary keys associated with the data records comprised in the first conflated data record; and
  identifying the data records comprised in the first conflated data record in the snapshots based on the primary keys.

15. The method of claim 9, further comprising:
  grouping the updated data record and a plurality of other data records in the second grouping based on the updated conflation for the updated data record and the data records of the dataset.

16. The method of claim 9, wherein, based on the identified data records comprised in the first conflated data record, the method further comprises:
  determining another conflated data record in the set of conflated data records;
  identifying additional data records comprised in the another conflated data record from the snapshots of the plurality of data sources; and
  generating the second conflated data record to include the identified additional data records.

17. A computer-readable medium comprising a physical storage device that excludes transitory signals on which is stored computer-readable instructions that, when executed by a processor, cause the processor to:
  generate snapshots of a plurality of data sources that include previous updates to data records in a dataset, the snapshots being copies of the plurality of data sources at particular points in time, wherein the data set comprises data records, from the plurality of data sources, arranged as a set of grouped data records in a plurality of groupings of data records from the plurality of data sources;
  store the generated snapshots of the plurality of data sources;
  receive an update from a data source among the plurality of data sources, wherein the update includes an update to update a data record in the dataset;
  determine, through application of a filter on the set of grouped data records, a first grouped data record among the set of grouped data records, the first grouped data record comprising the data record to be updated and other data records correlated to the data record in a first grouping among the plurality of groupings of data records;
  identify, in the generated snapshots corresponding to the plurality of data sources, source data records for the data record to be updated and the other data records comprised in the first grouped data record;
  update the first grouping of data records for the data record based on the update to generate an updated grouped data record for the data record, the updated grouped data record comprising a second grouping of data records including the updated data record and other data records correlated to the updated data record, the other data records correlated to the updated data record being identified in the snapshots of the plurality of data sources to generate the updated grouped data record; and
  update the set of grouped data records of the dataset to replace the first grouped data record with the updated grouped data record to incrementally update the dataset.

18. The computer-readable medium of claim 17, wherein the instructions cause the processor to:
  filter the set of grouped data records based on a rule to determine the first grouped data record including the data record, the rule being a user-defined rule that is associated with a level of precision of a match between the updated data record and the data records comprised in the set of grouped data records.

19. The computer-readable medium of claim 17, wherein the instructions cause the processor to:
  determine primary keys associated with the data records comprised in the first grouped data record; and
  identify the source data records for the first grouped data record from the snapshots based on the primary keys.

20. The computer-readable medium of claim 17, wherein the instructions cause the processor to:
  reprocess a grouping for each of the other data records in the first grouped data record to generate an updated grouped data record correlated to each of the other data records.

\* \* \* \* \*